United States Patent [19]

Sun et al.

[11] Patent Number: 5,262,699
[45] Date of Patent: Nov. 16, 1993

[54] STARTING AND OPERATING CIRCUIT FOR ARC DISCHARGE LAMP

[75] Inventors: Yiyoung Sun, Danvers; Long T. Nguyen, Salem, both of Mass.

[73] Assignee: GTE Products Corporation, Danvers, Mass.

[21] Appl. No.: 939,027

[22] Filed: Sep. 1, 1992

Related U.S. Application Data

[63] Continuation of Ser. No. 749,814, Aug. 26, 1991, abandoned.

[51] Int. Cl.$^5$ .............................................. H05B 37/02
[52] U.S. Cl. ................................ 315/209 R; 315/219;
315/224; 315/225; 315/307; 315/127;
315/DIG. 4; 315/DIG. 5; 315/DIG. 7;
363/132
[58] Field of Search ............... 315/209 R, 219, 224,
315/225, 307, 119, 121, 122, 208, 313, 244,
DIG. 5, DIG. 7, DIG. 4; 363/56, 28, 132

[56] References Cited

U.S. PATENT DOCUMENTS

| | | | |
|---|---|---|---|
| 4,503,363 | 3/1985 | Nilssen | 315/225 |
| 4,553,070 | 11/1985 | Sairanen | 315/209 R |
| 4,554,487 | 11/1985 | Nilssen | 315/224 |
| 4,644,228 | 2/1987 | Nilssen | 315/242 |
| 4,675,576 | 6/1987 | Nilssen | 315/242 |
| 4,961,027 | 10/1990 | Müssli | 315/58 |
| 5,051,661 | 9/1991 | Lee | 315/219 X |

FOREIGN PATENT DOCUMENTS 0346782  12/1989  France .

Primary Examiner—Robert J. Pascal
Assistant Examiner—Michael B. Shingleton
Attorney, Agent, or Firm—Carlo S. Bessone

[57] ABSTRACT

A circuit for starting and operating a discharge lamp, such as a compact fluorescent lamp, at high frequency from a 60 Hz AC supply. The circuit includes a DC power supply coupled to a pair of AC input terminals for generating a DC voltage. An oscillator coupled to the DC power supply includes a pair of semiconductor transistors and a drive transformer having a primary winding and at least one secondary winding. A load coupled to the output of the oscillator comprises a series combination of the primary winding of the drive transformer and a tank circuit including a tank inductor and a tank capacitor. Suitable means for connecting a discharge lamp in parallel with the tank capacitor is provided. An oscillator sensing and controlling circuit responsive to various lamp failure modes is coupled to the secondary winding of the transformer and reduces the output of the oscillator after a predetermined time delay by shunting the base of either one of the semiconductor switches of the oscillator. Upon replacement of the failed lamp, normal operation of the oscillator is resumed without having to disconnect the AC supply.

10 Claims, 1 Drawing Sheet

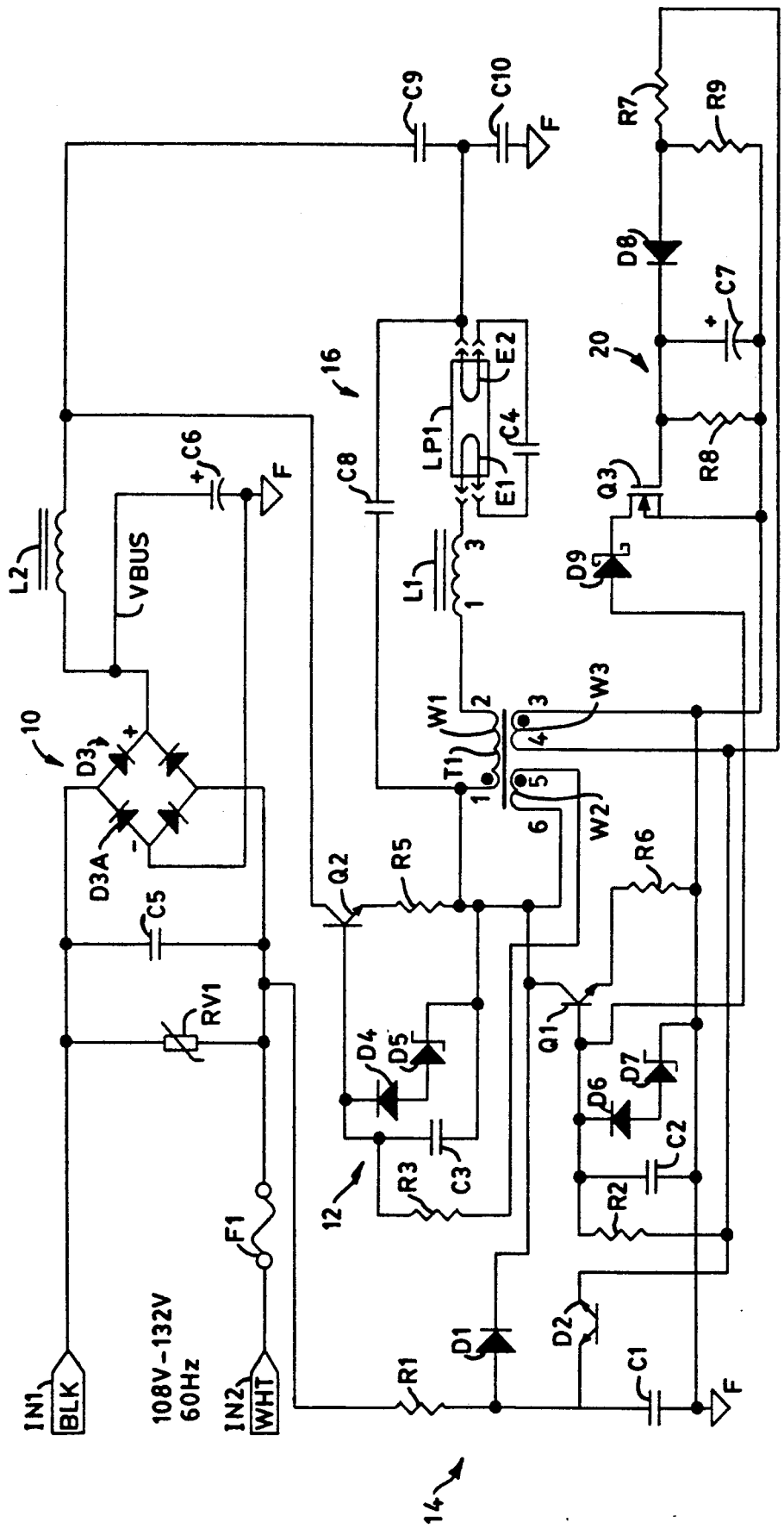

STARTING AND OPERATING CIRCUIT FOR ARC DISCHARGE LAMP

This is a continuation of copending application Ser. No. 07/749,814 filed on Aug. 26, 1991 now abandoned.

CROSS-REFERENCE TO RELATED APPLICATIONS

This application discloses and claims structural features for a starting and operating circuit which constitutes improvements over related subject matter disclosed and claimed in U.S. patent application Ser. No. 07/664,161 (now U.S. Pat. No. 5,138,235), filed Mar. 4, 1991 and assigned to the same assignee.

U.S. patent application Ser. No. 07/749,813 (now U.S. Pat. No. 5,142,202), filed concurrently herewith and assigned to the same assignee, contains related subject matter.

FIELD OF THE INVENTION

This invention relates to low-pressure discharge lamps, particularly fluorescent lamps, and especially to starting and operating circuitry for compact fluorescent lamps.

BACKGROUND OF THE INVENTION

Various types of operating circuits are known to start and operate compact fluorescent lamps. One type of circuit is illustrated in the FIG. 7 schematic of French Publication No. 0346782. This schematic is similar, in general principle, to the state of the art as practised in a lamp sold by the Osram Company under the registered trademark "DULUX EL" or in the lamp of the Philips Company which bears the denomination "PLC 20 Electronic". Using the circuit of French Publication 0346782 as an example of such circuits, after the two input terminals of the DC/AC converter (or oscillator) are energized by a DC voltage which appears across a filter capacitor, the starting capacitor C5 charges through a starting resistor R3 to a voltage which is substantially equal to the threshold voltage of the threshold element (i.e., the diac). The threshold element breaks down and supplies a pulse to the base terminal of transistor T2. As a result, transistor T2 begins to conduct. A current flows through transistor T2 and the load circuit. Subsequently, this transistor becomes non-conducting and the other transistor T1 becomes conducting. This process is then continuously repeated. This leads to an oscillation, i.e., an alternating current through the load circuit which includes the discharge tube.

U.S. Pat. No. 5,138,235 describes some disadvantages which may appear in some circuits similar to those described above. For example, when power to the circuit is removed, a momentary blink or flicker in the lamp may occur immediately after the tube is extinguished. It was observed that when AC power to the circuit is removed, a voltage initially remains on the filter capacitor of the DC power supply. This filter capacitor voltage gradually depletes to a point (usually greater than the starter threshold voltage) where the oscillator shuts down. However, the starting capacitor is allowed to recharge to a point where the threshold element of the starting circuit triggers causing the oscillator to conduct for a short period of time. Consequently, the discharge tube will blink or flicker as a result of current from the filter capacitor flowing through the conducting transistors and load circuit. This conduction continues for approximately 10 msecs. until the filter capacitor voltage is less than the starter's trigger voltage.

Another problem, which may appear in circuits similar to those described above, is at the end-of-lamp life when the emissive material on one or both of the filament electrodes has depleted. Although a discharge is unable to be established between the lamp electrodes, the oscillator may continue to conduct current through circuit components causing an unnecessary consumption of power until, for example, the AC power source is disconnected or the lamp and tank capacitor are removed from the load circuit. In the instances where the lamp is permanently connected to the circuitry, such as in an integral lamp unit, this latter option is unavailable.

U.S. Pat. No. 5,138,235 proposes the use of fusible-type base drive resistors. As a result of the increased current flow caused by the non-operable lamp, one of the fusible resistors creates an open circuit and thereby permanently inhibits operation of the oscillator.

While the use of fusible resistors to permanently inhibit the oscillator upon end-of-lamp life is indeed effective, it may be undesirable to implement this approach with a lamp unit containing a replaceable lamp without having made other provisions. It is apparent that following end-of-lamp life, the oscillator in a replaceable lamp unit must remain functional in order to accommodate a replacement lamp.

U.S. Pat. No. 4,554,487, which issued to Nilssen on Nov. 19, 1985, describes a subassembly which disables the inverter in case the inverter output power remains at an excessive magnitude for more than a very brief period. The input of the subassembly includes a voltage-clamping device (e.g., a varistor) coupled in parallel with the tank capacitor of a series-resonant LC circuit so as to limit the voltage developed thereacross. Also included in the subassembly is a current sensing circuit for sensing current flow through the varistor. The output of the subassembly is connected directly to the junction of transistor Q2 and the secondary winding CT2s of positive feedback current transformer CT2. While such disabling circuitry may effectively prevent the inverter from self-destructing in case the fluorescent lamp fails to start or if the lamp is removed from the circuit, several disadvantages still exist with this approach. For example, the subassembly of Nilssen requires a high voltage clamping device (e.g., a varistor) which may be relatively expensive. Moreover, once the inverter illustrated in FIG. 1 of Nilssen has stopped oscillating, the inverter will not restart until power line voltage is removed and then reapplied at a later time (i.e., after much of the charge on the filter capacitors has had a chance to leak off). It may be advantageous to be able to replace a failed lamp without having to remove the power line voltage.

Another approach is described in U.S. Pat. No. 4,644,228, which issued to Nilssen on Feb. 17, 1987, wherein a control means provides a short circuit across the tank capacitor in the event the lamp fails to conduct within about 25 milliseconds. After about 1.5 second, the short circuit is removed for about 25 milli-seconds, thereby permitting the voltage across the tank capacitor to grow to a magnitude sufficient to ignite and operate the lamp. If lamp current does not then flow, or if at any time it ceases to flow, the short will be reapplied within 25 milli-seconds. Thereafter, until power is removed or until an operable lamp is connected, the control means will continuously repeat the cycle of 1.5 second short circuit and 25 milliseconds open circuit. While such control means, which periodically provide a short circuit across the tank capacitor, may operate effectively without requiring the removal and reapplication of power in order to replace a failed lamp, the control circuit requires the use of high voltage components, such as varistor V, bridge rectifier BR and transistor Qa in order to withstand the high lamp starting voltage.

SUMMARY OF THE INVENTION

It is, therefore, an object of the present invention to obviate the disadvantages of the prior art.

It is still another object of the invention to provide an improved circuit for starting and operating a discharge lamp which does not require a voltage limiting device in the oscillator disabling circuitry.

It is another object of the invention to provide an improved circuit which remains fully operable upon failure of the lamp and does not require removal of the power line voltage in order to replace a failed lamp.

It is still another object of the invention to provide an improved circuit having a protection circuit which does not require relatively expensive, high voltage components in the oscillator disabling circuitry.

These objects are accomplished in one aspect of the invention by the provision of a starting and operating circuit for a discharge lamp comprising a pair of AC input terminals adapted to receive an AC signal from an AC power supply and a DC power supply coupled to the AC input terminals for generating a DC voltage. An oscillator coupled to the DC power supply includes oscillator drive means including at least one semiconductor switch and a transformer having a primary winding and a secondary winding. The secondary winding is coupled to the semiconductor switch of the oscillator. Load means coupled to the output of the oscillator comprises a series combination of the primary winding of the oscillator drive transformer and a tank circuit including a tank inductor and a tank capacitor. Means is provided for connecting a discharge lamp in parallel with the tank capacitor. Oscillator sensing and controlling means is coupled to the secondary winding of the oscillator drive transformer for sensing the output of the oscillator and then for reducing the output of the oscillator after a predetermined time delay following the initiation of a resonant mode condition of the tank circuit.

In accordance with further teachings of the present invention, the oscillator sensing and controlling means includes a series combination of a diode and a semiconductor switch means coupled across the input terminal of the semiconductor switch means of the oscillator. Preferably, the oscillator controlling means includes voltage rectifying means in series with the charging resistor means in addition to means for controlling the duty cycle of the semiconductor switch means.

Additional objects, advantages and novel features of the invention will be set forth in the description which follows, and in part will become apparent to those skilled in the art upon examination of the following or may be learned by practice of the invention. The aforementioned objects and advantages of the invention may be realized and attained by means of the instrumentalities and combination particularly pointed out in the appended claims.

BRIEF DESCRIPTION OF THE DRAWINGS

The invention will become more readily apparent from the following exemplary description in connection with the accompanying FIGURE. This FIGURE represents a schematic diagram of a preferred embodiment of a starting and operating circuit for a discharge lamp according to the present invention.

BEST MODE FOR CARRYING OUT THE INVENTION

For a better understanding of the present invention, together with other and further objects, advantages and capabilities thereof, reference is made to the following disclosure and appended claims in connection with the above-described drawings.

The sole FIGURE represents a schematic diagram of a preferred embodiment of a starting and operating circuit for a discharge lamp LP1. Lamp LP1 is an arc discharge lamp such as a low-pressure fluorescent lamp having a pair of opposing filamentary electrodes E1, E2. Each of the filamentary electrodes is coated during manufacturing with a quantity of emissive material. Lamp LP1, which forms part of a load circuit 16, is ignited and fed via an oscillator 12 which operates as a DC/AC converter. Oscillator 12 receives filtered DC power from a DC power supply 10 which is coupled to a source of AC power. Conduction of oscillator 12 is initiated by a starting circuit 4. Upon detection of an abnormal increase in load current caused by operating the circuit with a lamp which has an internally shorted coil or by operating the circuit with a lamp having a depleted lamp coil or a cracked envelope, a voltage sensing and oscillator regulating circuit 20 temporarily shunts oscillator drive current and thereby substantially reduces the oscillator output.

A pair of input terminals IN1, IN2 are connected to an AC power supply such as 108 to 132 volts, 60 Hz. A transient suppressor RV1 is shunted across input terminals IN1, IN2 in order to absorb any surge energy that may otherwise cause damage to the circuit. The AC input power is coupled by way of a fuse F1 to the input of DC power supply 10 which consists of diode rectifier bridge D3 and a filter capacitor C6. Capacitor C6 filters the rectified AC voltage so that the bus voltage (VBUS) is a DC voltage with minimal low frequency modulation which serves to minimize lamp current crest factor. A capacitor C5, which is connected in parallel with transient suppressor RV1 and the input to DC power supply 10, and an inductor L2 connected to the positive output terminal of DC power supply 10 serve to suppress EMI generated by oscillator 12.

Oscillator 12, which includes (as primary operating components) a pair of series-coupled semiconductor switches, such as bipolar transistors Q1, Q2 or MOSFETS (not shown), is coupled in parallel with the output of DC power supply 10. The collector of transistor Q2 is connected to one end of inductor L2 while the emitter of transistor Q2 is connected to one end of a resistor R5. The other end of resistor R5 is connected to the collector of transistor Q1. The emitter of transistor Q1 is coupled to circuit ground through a resistor R6. During lamp operation, emitter resistors R5 and R6 minimize lamp current variations caused by temperature. More specifically, as the junction temperatures of transistors Q1 and Q2 increase due to increases in ambient temperature, the base-emitter voltages of Q1 and Q2 tend to decrease. As a result, the voltage drop across resistors R5 and R6 increases and thereby compensates for the decrease in the base-emitter voltage. Consequently, the lamp current will remain relatively constant with temperature. In addition to compensating for temperature variations, resistor R6 acts to limit the current through transistor Q1 at initial startup.

For transistor protection during starting, a series combination of a diode D4 and a zener diode D5 is connected across the base-emitter junction of transistor Q2. Similarly, a series combination of a diode D6 and a zener diode D7 is connected across the base-emitter junction of transistor Q1.

Base drive and switching control for transistors Q1 and Q2 are provided by secondary windings W3, W2 of a saturable transformer T1, base resistors R2 and R3, and capacitors C2 and C3, respectively. The values of resistors R2 and R3 are chosen so that transistor control or base leads are properly driven.

Oscillator starting circuit 14 includes a series arrangement of a resistor R1 and a capacitor C1. The junction point between resistor R1 and capacitor C1 is connected to a bidirectional threshold element D2 (i.e., a diac). One end of threshold element D2 is coupled to the base or input terminal of transistor Q1 through base resistor R2. As illustrated in the FIGURE, the input of the oscillator starting circuit 14 (i.e., the upper end of resistor R1) is connected to one of the terminals (e.g., IN2) applied to the AC power supply.

During normal lamp operation, oscillator starting circuit 14 is rendered inoperable due to a diode rectifier D1 connected to the junction point of resistor R1 and capacitor C1. During lamp operation, diode rectifier D1 holds the voltage across starting capacitor C1 at a level which is lower than the threshold voltage of threshold element D2. The time constant of R1 and C1 should be longer than the reciprocal of the operating frequency of the oscillator in order to insure that capacitor C1 does not recharge during normal operation to the threshold voltage of element D2.

Series capacitors C9 and C10 form one of the two legs of the half-bridge topology. The other leg being formed by the series coupled transistors Q1 and Q2. Unlike conventional half-bridge circuits in which the two capacitors are the main energy reservoirs, in the present circuit capacitors C9 and C10 function as a voltage divider and help shunt EMI/RFI noise generated by transistors Q1 and Q2.

Load circuit 16 comprises a series combination of a primary winding W1 of transformer T1 and an inductor L1 connected in series with a parallel combination formed by capacitor C4 and lamp LP1 (when connected). Terminal 1 of inductor L1 is connected to terminal 2 of winding W1. Inductor L1 comprises the principle ballasting element for the lamp. The saturation of transformer T1 influences the switching frequency of transistors Q1 and Q2. Typically, the transistor switching frequency is from about 25 Khz to 39 Khz. Preferably, the switching frequency is about 30 Khz. During lamp operation, the impedance of capacitor C4 is much higher than the impedance of the lamp, so capacitor C4 acts as an open circuit. The total load impedance is the sum of the impedance of inductor L1 and the lamp impedance in series, which will make the lamp current a sawtooth waveform. The resonant frequency during normal operation is very different from the resonant frequency during startup. In normal operation, the load circuit is in a critically damped mode.

Load circuit 16 further includes a capacitor C8, connected across the circuit arrangement of primary winding W1, inductor L1, lamp LP1 (when connected) and capacitor C4. Capacitor C8 forms a single element snubber circuit which reduces the rise time and thus the switching losses of transistors Q1 and Q2. As a result of the reduction in rise time (or equivalent reduction in $dV_{ce}/dt$) of transistors Q1 and Q2, high voltage spikes which normally generate EMI/RFI noise are reduced.

Preferably, the terminals of discharge lamp LP1 are connected to load circuit 16 by means of suitable sockets in order to facilitate lamp replacement. In the arrangement shown in the FIGURE, capacitor C4 is adapted to be coupled to terminal 3 of inductor L1 and to one end of capacitor C8 (and the junction of capacitors C9 and C10) through electrodes E1 and E2, respectively, when the lamp terminals are connected to the socket terminals. Although the FIGURE illustrates that each electrode E1, E2 is coupled via a pair of lamp terminals to a pair of socket terminals, other coupling arrangements are possible. For example, if lamp replacement is not desired, as in the case of an integral lamp unit, lamp LP1 may be directly wired to the load circuit 16. Also, as is conventional in instant-start fluorescent lamps, the lead-in wires from each cathode may be shorted together resulting in a single terminal being available from each electrode. In the latter case, capacitor C4 may be directly connected to terminal 3 of inductor L1 and to capacitor C8 (at the junction of capacitors C9 and C10).

In accordance with the teachings of the present invention, the starting and operating circuit further includes means for temporarily reducing the output of the oscillator upon detection of an abnormal lamp condition, such as the depletion of emissive material on one or more of the lamp electrodes or a cracked lamp envelope.

In a preferred embodiment, the starting and operating circuit includes a voltage sensing and oscillator regulating circuit 20. Upon detection of an abnormal increase in load current as detected by an increase in voltage across winding W3, circuit 20 causes conduction of a semiconductor switch Q3 in the oscillator regulating portion of circuit 20 which causes a temporary shunting of oscillator drive current.

In the embodiment illustrated in the FIGURE, the input of circuit 20 is connected to secondary winding W3 on transformer T1. Terminal 4 of winding W3 is connected to a voltage divider resistor R7. The other end of resistor R7 is connected to a voltage divider resistor R9 whose other end is connected to terminal 3 of winding W3 which is also connected to circuit ground. The junction of voltage divider resistors R7 and R9 is connected to the anode of a diode D8. The cathode of diode D8 is connected to one end of a capacitor C7. A discharge resistor R8 is connected across the terminals of capacitor C7. The junction formed by resistor R8, capacitor C7 and the cathode of diode D8 is connected to the gate (or input) terminal of a semiconductor switch Q3 which preferably consists of a MOSFET. Alternatively, semiconductor switch Q3 may be, for example, an IGBT. The drain terminal of semiconductor switch Q3 is connected to the cathode of a diode D9. In order to provide a relatively low forward voltage drop (i.e., less than 0.5 volts) across the base of transistor Q1 and ground, diode D9 is preferably a schottky or germanium diode. The source terminal of semiconductor switch Q3 is coupled to circuit ground.

Since the maximum voltage developed across winding W3 of transformer T1 is only about 10 to 15 volts during lamp starting and 5 to 6 volts during normal operation, diode D9 and transistor Q3 have relatively low voltage ratings. Moreover, a voltage clamping device (i.e., a varistor) is not necessary.

According to the teachings of U.S. Pat. No. 5,138,235, base drive resistors R2 and R3 and emitter resistors R5 and R6 may be fusible type resistors. As a result of the increased current flow in the oscillator, one of the fusible resistors creates an open circuit and thereby permanently inhibits operation of the oscillator.

Without having made other provisions, the use of fusible resistors to permanently inhibit the oscillator upon end-of-lamp life may be undesirable when used with a lamp unit containing a replaceable lamp. However, to provide added protection in the event that one of the components of oscillator control circuitry should unexpectedly fail and render this portion of the starting and operating circuit inoperable, the use of fusible resistors in accordance with the teachings of U.S. Pat. No. 5,138,235 is recommended.

The operation of the circuit will now be discussed. When terminals IN1 and IN2 are connected to a suitable AC power source, DC power source 10 rectifies and filters the AC signal and develops a DC voltage (VBUS) across capacitor C6. Simultaneously, during the negative half cycle of the AC input signal, starting capacitor C1 in oscillator starting circuit 14 begins to charge through resistor R1 to a voltage which is substantially equal to the threshold voltage of threshold element D2. Upon reaching the threshold voltage (e.g., 32 volts), the threshold element breaks down and supplies a pulse to the input or base terminal of transistor Q1. As a result, current from the VBUS supply flows to circuit ground through inductor L2, capacitor C9, capacitor C4, ballast inductor L1, primary winding W1 of transformer T1, the collector-emitter junction of transistor Q1 and emitter resistor R6. Since the lamp is essentially an open circuit during starting, no current flows through the lamp at this time. Current flowing through primary winding W1 causes saturation of the core of transformer T1 which forces the inductance of the transformer T1 to drop to zero. A resulting collapse in the magnetic field in transformer T1 causes a reverse in polarity on secondary windings W2 and W3 of transformer T1. As a result, transistor Q1 is turned off and transistor Q2 is turned on. Current now flows to ground through inductor L2, the collector-emitter junction of transistor Q2, emitter resistor R5, primary winding W1 of transformer T1, ballast inductor L1, capacitors C4 and C10. This process is repeated causing a high voltage to be developed across capacitor C4 (and lamp LP1) as a result of a series resonant circuit formed by capacitors C4, C9, C10 and ballast inductor L1. The high voltage developed across capacitor C4 is sufficient to ignite lamp LP1. In addition to igniting lamp LP1, capacitor C4 improves lamp current crest factor.

During normal lamp operation, oscillator starting circuit 14 is rendered inoperable due, in part, to rectifier D1 which holds the voltage across starting capacitor C1 at a level which is lower than the threshold voltage of threshold element D2. Any charge developed across starting capacitor C1 during this period is continuously discharged to circuit ground through diode D1, the collector-emitter junction of transistor Q1 and emitter resistor R6. In addition, the time constant of R1 and C1 is selected to be longer than the reciprocal of the operating frequency of the oscillator so that capacitor C1 will not recharge through resistor R1 to a level to retrigger diac D2.

When AC input power to the circuit is removed, starting capacitor C1 is unable to receive energy from filter capacitor C6 since the input to the starting circuit (i.e., the upper end of resistor R1) is connected to one of the input terminals IN2. As a result, current from the filter capacitor will be unable to flow through the conducting transistors and load circuit to otherwise cause the lamp to momentarily blink or flicker after the lamp has extinguished.

It is noted that capacitor C1 charges only when the AC input voltage on input terminal IN2 is positive with respect to input terminal IN1. During this half cycle of the AC supply, current flows from input terminal IN2, through fuse F1, resistor R1, capacitor C1, diode leg D3A (of diode rectifier bridge D3) to input terminal IN1. No charge path for capacitor C1 is provided when the AC input voltage on input terminal IN2 is negative with respect to input terminal IN1. In addition to preventing this momentary blink or flicker discussed above, the power dissipated by resistor R1 is reduced since resistor R1 only sees 60 Hz half wave voltage.

Upon an end-of-life condition caused by the depletion of emissive material on one or both of the lamp filament electrodes (if the electrodes and lamp envelope remain intact), the lamp acts as an open circuit element. Under such conditions, the circuit will then run in a series resonant mode with resonant elements of inductor L1 and capacitor C4. A similar series resonant mode will occur, for example, if the lamp is disconnected from a load circuit wherein capacitor C4 is directly connected to terminal 3 of inductor L1 and to capacitor C8 (at the junction of capacitors C9 and C10).

By the nature of any series resonant circuit, the combined impedance of inductor L1 and capacitor C4 is zero. The only noticeable impedance in the circuit is the emitter resistor, the winding resistance of inductor L1 and the collector-emitter resistance. The combination of these resistances is very small. Basically, the circuit is in a short circuit mode. Consequently, the short circuit current of transistors Q1 and Q2 will be very high.

Upon detection of an abnormal lamp condition as discussed above, the increased current through winding W1, tank inductor L1, and tank capacitor C4 produces an AC voltage of approximately 10 to 15 volts across terminals 3 and 4 of secondary winding W3. This AC voltage is divided by resistors R7 and R9 before being half-wave rectified by diode D8. The resulting rectified voltage at the cathode of diode D8 charges capacitor C7. When the voltage on capacitor C7 reaches the threshold voltage $V_{th}$ of the semiconductor switch Q3 (e.g., 3.0 to 4.0 volts), switch Q3 becomes conductive and temporarily shorts the base of transistor Q1 and the ground through diode D9 and the drain-source junction of semiconductor switch Q3. The base current of transistor Q1 is diverted into diode D9 and the drain-source junction of semiconductor switch Q3. This diverted current approximately follows the following equation:

$$i_{d(Q3)} = K(v_{gs} - V_{th})^2;$$

where K is proportional to the forward transconductance, $v_{gs}$ is the gate-source voltage of transistor Q3 and $V_{th}$ is the threshold voltage of transistor Q3. As a result, the voltage developed across the base of transistor Q1 and the ground is limited to the voltage drop produced by the series combination of diode D9 and the drain-source junction of semiconductor switch Q3.

Because of the limited voltage on the base of transistor Q1 and the ground, the base drive current will be insufficient to turn on transistor Q1, causing an interruption in operation of the oscillator. Thereafter, the voltage on secondary winding W3 drops to zero and the voltage across capacitor C7 begins to discharge through discharge resistor R8. When the voltage across capacitor C7 drops below the threshold voltage of semiconductor switch Q3, switch Q3 becomes non-conductive and the diode shunt across the base of transistor Q1 and the ground is effectively removed. Consequently, conduction of the transistors Q1 and Q2 is resumed.

The amount of time the oscillator is on, and hence the duty cycle during this mode of operation, is determined by the proper selection of resistors R7, R8, R9, capacitor C7 and the forward transconductance $g_{fs}$ and the threshold voltage $V_{th}$ of transistor Q3. The charging time constant established by resistors R7, R9, capacitor C7 and the threshold voltage $V_{th}$ of transistor Q3 determines the oscillator initial starting delay. The forward transconductance of transistor Q3 and the charging time constant established by resistors R7, R9 and capacitor C7 determines the on-time while the discharging time constant of resistor R8 and capacitor C7 determines the oscillator off-time. Preferably, the values of resistors R7, R8, R9, capacitor C7 and the characteristics of transistor Q3 are chosen so that the respective time constants cause the oscillator to be off substantially the entire duty cycle. In a preferred embodiment, the oscillator during this mode of operation is on for approximately 200 milliseconds and off for 10.0 seconds. This results in a duty cycle of 2 percent.

Upon replacement of lamp LP1, the oscillator will return to full power operation since the voltage developed across winding W3 is insufficient to trigger semiconductor switch Q3 through voltage divider resistors R7 and R9.

Although the preferred embodiment teaches the creation of a diode shunt across the base of transistor Q1 and the ground, it will be apparent to those skilled in the art that other alternative methods can be utilized without departing from the scope of the invention. For example, it is possible to interrupt base drive to transistors Q2 by shunting the base of transistor Q2 while sensing winding W2 instead of shunting the base of transistor Q1 while sensing winding W3.

As a specific example but in no way to be construed as a limitation, the following components are appropriate to an embodiment of the present disclosure, as illustrated by the FIGURE:

| Item | Description | Value or Part No. |
|---|---|---|
| C1 | Capacitor | 0.047MFD, 50VDC, SMD |
| C2 | Capacitor | 0.047MFD, 50VDC, SMD |
| C3 | Capacitor | 0.047MFD, 50VDC, SMD |
| C4 | Capacitor | 0.01MFD, 1000VDC |
| C5 | Capacitor | 0.022MFD, 250VAC |
| C6 | Capacitor | 47 MFD, 200VDC |
| C7 | Capacitor | 10 MFD, 25VDC, SMD |
| C8 | Capacitor | 2200PFD, 250VDC/160VAC |
| C9 | Capacitor | 0.22MFD, 160VDC/100VAC |
| C10 | Capacitor | 0.22MFD, 160VDC/100VAC |
| D1 | Diode | BYD17J |
| D2 | Diac | 2A, 32V (BR100/03) |
| D3 | Bridge | BYD17J (4) |
| D4 | Diode | DL4933 |
| D5 | Diode | DL4738A |
| D6 | Diode | DL4933 |

-continued

| Item | Description | Value or Part No. |
|---|---|---|
| D7 | Diode | DL4738A |
| D8 | Diode | DL4148 |
| D9 | Diode | SGL41-40 |
| R1 | Resistor | 510 Kohm, ¼W, SMD |
| R2 | Resistor | 20 ohm, ¼W Fusible (Philips NFR25) |
| R3 | Resistor | 20 ohm, ¼W Fusible (Philips NFR25) |
| R5 | Resistor | 1.3 ohm, ¼W Fusible (Philips NFR25) |
| R6 | Resistor | 1.3 ohm, ¼W Fusible (Philips NFR25) |
| R7 | Resistor | 11 Kohm, ¼W, SMD |
| R8 | Resistor | 10 Mohm, ¼W, SMD |
| R9 | Resistor | 11 Kohm, ¼W, SMD |
| Q1 | Transistor | 5.0A, 850V (BUV46) |
| Q2 | Transistor | 5.0A, 850V (BUV46) |
| Q3 | Transistor | IRFR010, (50V, 0.2 ohm) |
| L1 | Inductor | 1.2MH |
| L2 | Inductor | 1.0MH, 200MA |
| T1 | Transformer (Base Drive) | 6 turns prim. 5 turns each sec. |
| RV1 | MOV | 150VAC, 500A 240CH8, SMD |
| F1 | Fuse | 2.5A, PICO II |
| LP | Lamp | F13DTT |

There has thus been shown and described a circuit for starting and operating an arc discharge lamp. The invention does not require a voltage limiting device in the oscillator disabling circuitry and does not require removal of the power line voltage to replace a failed lamp. In addition, the circuit remains fully operable upon failure of the lamp and does not require relatively expensive, high voltage components in the oscillator disabling circuitry. Moreover, the circuit does not cause an unnecessary use of energy due to continued oscillator operation upon an end of lamp life condition caused by the depletion of emissive material on one of the lamp filament electrodes.

While there have been shown and described what are at present considered to be the preferred embodiments of the invention, it will be apparent to those skilled in the art that various changes and modifications can be made herein without departing from the scope of the invention. Therefore, the aim in the appended claims is to cover all such changes and modifications as fall within the true spirit and scope of the invention. The matter set forth in the foregoing description and accompanying drawings is offered by way of illustration only and not as a limitation. The actual scope of the invention is intended to be defined in the following claims when viewed in their proper perspective based on the prior art.

What is claimed is:

1. A starting and operating circuit for a discharge lamp comprising:
   a pair of AC input terminals adapted to receive an AC signal from an AC power supply;
   DC power supply means coupled to said AC input terminals for generating a DC voltage;
   oscillator means coupled to said DC power supply means to receive said DC voltage and including at least one semiconductor switch and means for driving said semiconductor switch, said driving means including a transformer having a primary winding and a secondary winding, said secondary winding being coupled to said semiconductor switch of said oscillator means;
   load means coupled to the output of said oscillator means comprising a series combination of said primary winding of said transformer and a tank circuit including a tank inductor and a tank capacitor, said tank circuit having a resonant mode condition;

means for connecting a discharge lamp in parallel with said tank capacitor; and oscillator sensing and controlling means having an input connected directly across said secondary winding of said transformer for sensing the output of said oscillator means and for reducing the output of said oscillator means after a predetermined time delay following the initiation of said resonant mode condition of said tank circuit, said oscillator sensing and controlling means including means for shunting drive current to said at least one semiconductor switch of said oscillator means.

2. The starting and operating circuit of claim 1 wherein said oscillator sensing and controlling means includes a series combination of a diode and a semiconductor switch means coupled across the input terminal of said at least one semiconductor switch.

3. The starting and operating circuit of claim 2 further including means for controlling the duty cycle of said oscillator means following the initiation of said resonant mode condition of said tank circuit.

4. The starting and operating circuit of claim 3 wherein said oscillator sensing and controlling means further includes voltage rectifying means in series with charging resistor means.

5. The starting and operating circuit of claim 1 wherein said predetermined time delay is approximately 200 milliseconds.

6. An arrangement comprising:

a pair of AC input terminals adapted to receive an AC signal from an AC power supply;

DC power supply means coupled to said AC input terminals for generating a DC voltage;

oscillator means coupled to said DC power supply means to receive said DC voltage and including a pair of semiconductor switches and means for driving said semiconductor switches, said driving means including a transformer having a primary winding and first and second secondary windings coupled respectively to said semiconductor switches;

load means coupled to the output of said oscillator means comprising a series combination of said primary winding of said transformer and a tank circuit including a tank inductor and a tank capacitor, said tank circuit having a resonant mode condition;

a discharge lamp having lamp terminals;

means for connecting said lamp terminals in parallel with said tank capacitor; and oscillator sensing and controlling means having an input connected directly across one of said secondary windings of said transformer and an output coupled to one of said pair of semiconductor switches of said oscillator means for reducing the output of said oscillator means after a predetermined time delay following the initiation of said resonant mode condition of said tank circuit, said oscillator sensing and controlling means including means for shunting drive current to said one of said pair of semiconductor switches of said oscillator means.

7. The arrangement of claim 6 wherein said oscillator sensing and controlling means includes a diode and a semiconductor switch means coupled across the base terminal of one of said semiconductor switches.

8. The arrangement of claim 7 further including means for controlling the duty cycle of said oscillator means following the initiation of said resonant mode condition of said tank circuit.

9. The arrangement of claim 8 wherein said oscillator sensing and controlling means further includes voltage rectifying means in series with charging resistor means.

10. The arrangement of claim 7 wherein said predetermined time delay is approximately 200 milliseconds.

* * * * *